United States Patent [19]

Richardson

[11] 3,890,665
[45] June 24, 1975

[54] PIPELINE CLEANING BALL AND VALVE STRUCTURE

[75] Inventor: Murl R. Richardson, Fort Worth, Tex.

[73] Assignee: Oil States Rubber Co., Arlington, Tex.

[22] Filed: Oct. 1, 1973

[21] Appl. No.: 402,082

[52] U.S. Cl......... 15/104.06 R; 137/232; 273/65 C
[51] Int. Cl............................................... B08b 9/04
[58] Field of Search...... 15/104.06 R; 137/223, 232; 46/87–90, 44; 152/429; 273/65 C, 65 D

[56] References Cited
UNITED STATES PATENTS

| | | | |
|---|---|---|---|
| 1,564,624 | 12/1925 | Riley | 137/232 |
| 1,756,056 | 4/1930 | Dorward | 137/223 X |
| 2,935,320 | 5/1960 | Chupa | 46/90 X |
| 3,041,204 | 6/1962 | Green | 15/104.06 R X |
| 3,247,882 | 6/1966 | Pratt | 152/429 |
| 3,343,561 | 9/1967 | Bowerman | 15/104.06 R X |

*Primary Examiner*—Edward L. Roberts
*Attorney, Agent, or Firm*—Dowell & Dowell

[57] ABSTRACT

A pipeline cleaning go-devil in the form of an inflatable ball and valve structure in which a rigid valve assembly is bonded in the wall of the ball which supports it, said valve assembly being recessed in a well in the ball sufficiently far that much of the wall thickness can be worn from the ball before the valve assembly is in danger of striking the inner surface of the pipeline, the valve assembly including means for sealing the ball temporarily after inflation and while an inflating adapter is being removed from the valve assembly, the latter then being sealed positively by a plug which stays in place during use of the ball.

6 Claims, 8 Drawing Figures

PIPELINE CLEANING BALL AND VALVE STRUCTURE

FIELD OF INVENTION

This invention relates to valved pipeline cleaning balls of the type which are inflatable through a valve assembly to permit the ball to be sized precisely with respect to the inside diameter of the pipeline into which the ball will be introduced and through which the ball will be fluid-pressure propelled for pipeline cleaning and/or batch-separation.

BACKGROUND AND PRIOR ART

It has long been the practice to use elastomeric balls as pipeline cleaning devices or go-devils, for instance of the type shown in Bowerman U.S. Pat. No. 3,343,561. This type of pipeline cleaning ball is manufactured in a variety of different sizes respectively intended to be used in pipelines of graduated nominal diameters ranging from a few inches to several feet in the usual case. The specified nominal diameters of larger pipelines refer to their outside diameters, and therefore, a pipeline of a certain number of inches nominal diameter can vary somewhat as to its inside diameter depending upon the thickness of the pipe wall. However, it is very necessary to have the pipeline ball fit the pipeline accurately in view of the fact that a ball of too small a diameter will pass freely through the pipeline and fail to wipe it with the necessary squeegee wiping action, whereas a ball of too large a diameter will be unduly worn at its outer surface as it passes through the pipeline. It is not uncommon for such a ball to travel 50 to 100 miles within a pipeline, and therefore, sizing the ball to the correct diameter is very important. In order to achieve the correct diameter of the ball for use in a particular pipeline, it is usual practice to manufacture the ball slightly smaller than the inside diameter of the thickest wall pipe having the nominal size in which the ball is to be used, such a ball being made perhaps 2 to 5 percent undersize. The ball diameter is then increased before use to the desired diameter by inflating it somewhat. It is common to use inflation hoops to gauge when the ball has been inflated precisely to the required diameter, the hoops being graduated for various anticipated diameters, temperatures, and pressures which the ball will be expected to encounter during its travel through a given pipeline. After the ball has travelled a considerable distance and has become worn on its outer surface, it can then be removed from the pipeline and further inflated to bring it back up to size prior to making a subsequent pass through the pipeline.

The prior art includes a few valved ball devices, for example as shown in U.S. Pat. No. 3,343,561, supra, which are intended for pipeline use, but many of the prior art valves have proved to be ineffective for the purpose intended. Obviously, it is necessary for a valve to retain the inflated pressure within the ball, but many of the prior art valves are not adequate for this purpose. Moreover, it is also highly desirable that a valve prevent further inflation of the ball during use if and when it encounters a zone in the pipeline where the pressure is locally higher than the pressure to which the ball has been inflated. It is not uncommon for such zones to exist, and sometimes a ball will pass through such a zone and have its internal pressure increased by undesirable leakage of fluid pressure from outside the ball into its center. Then when the ball returns to a zone of the pipeline having the nominal pressure for which it was initially inflated, it is then too large for the pipeline and consequently becomes badly worn during its further passage therethrough. There have been instances when the ball has been recovered from a pipeline so badly overinflated that it has grown to several times the desired diameter. Experience with the valves shown in U.S. Pat. No. 3,343,561 has indicated that this type of valve is not sufficiently reliable and sometimes permits leakage.

Another serious problem which has reduced the performance record of prior art pipeline balls and valves has been the fact that the valves were located too close to the outer surface of the ball, with the result that the valve is abraded as the surface of the ball is worn away, or else that it is torn from the ball as a result of encountering projections extending internally into the pipeline as is sometimes the case in the vicinity of pipeline welds. When a valve placed close to the outer surface of the ball is damaged early in the life of the ball, the ball becomes useless although in fact its wall thickness would still be sufficient to permit it to be used for sometime to come if its valve had not been destroyed. Large diameter balls are particularly expensive and it is therefore important that their useful life be extended as much as possible.

THE INVENTION

It is therefore a principal object of the present invention to provide a ball and valve structure in which the valve is effective to provide a positive seal when the valve is closed thereby preventing the passage of fluid under pressure either into the ball from outside or outside of the ball from inside when the valve is closed.

It is another major object of this invention to provide a ball and valve structure in which the valve assembly is recessed well within the outer periphery of the ball to thereby clear a large percentage of the thickness of its wall which can be worn away before the valve assembly begins to wear against the inner surface of the pipeline. More particularly, it is an object of this invention to thicken the wall of the ball at its inner surface in the vicinity of the valve assembly whereby to provide adequate support for the valve assembly even though it is deeply recessed within a well extending inwardly from the periphery of the ball.

It is another object of this invention to provide a valve closing plug supporting an elongated elastomeric core member shaped to fill the well into which the valve assembly is recessed substantially flush with the outer periphery of the ball so that its outer surface is essentially smooth, this type of structure being especially valuable in connection with balls which are used for flow-meter prover service wherein the balls pass several meter stations and are used to check the actual volumetric flow of fluid. If the well in the outer surface of the ball is not substantially filled, the flow meter will provide a somewhat erroneous reading caused by the failure of the ball to completely prevent leakage past its surface as it travels through the pipeline.

It is another object of the invention to provide a pipeline cleaning ball valve which is closed by positive screw-plug means, but which also has a temporary check-valve closure means by which the inflation pressure is retained for the brief period of time between the time when an inflating adapter is removed from the ball and the time when the positive sealing plug is screwed into place, thereby retaining the pressure in the ball until a positive seal of the valve assembly can be made.

Another object of the invention is to provide a valve assembly in three separable parts including a sleeve member which is bonded into the elastomeric wall of the ball itself and after bonding is not removable therefrom, further including a threaded valve carrier member which can be screwed into the sleeve and is removable therefrom during the lifetime of the ball, this carrier member containing a check valve and retaining means which might require service or replacement during the life of the ball, and finally including a removable plug member and O-ring seal constituting the final positive sealing member of the valve assembly, and this plug member being removed and replaced by an inflation adapter attached for the purpose of inflating the ball.

Other objects and advantages of the invention will become apparent during the following discussion of the drawings, wherein:

THE DRAWINGS

Figure 6:
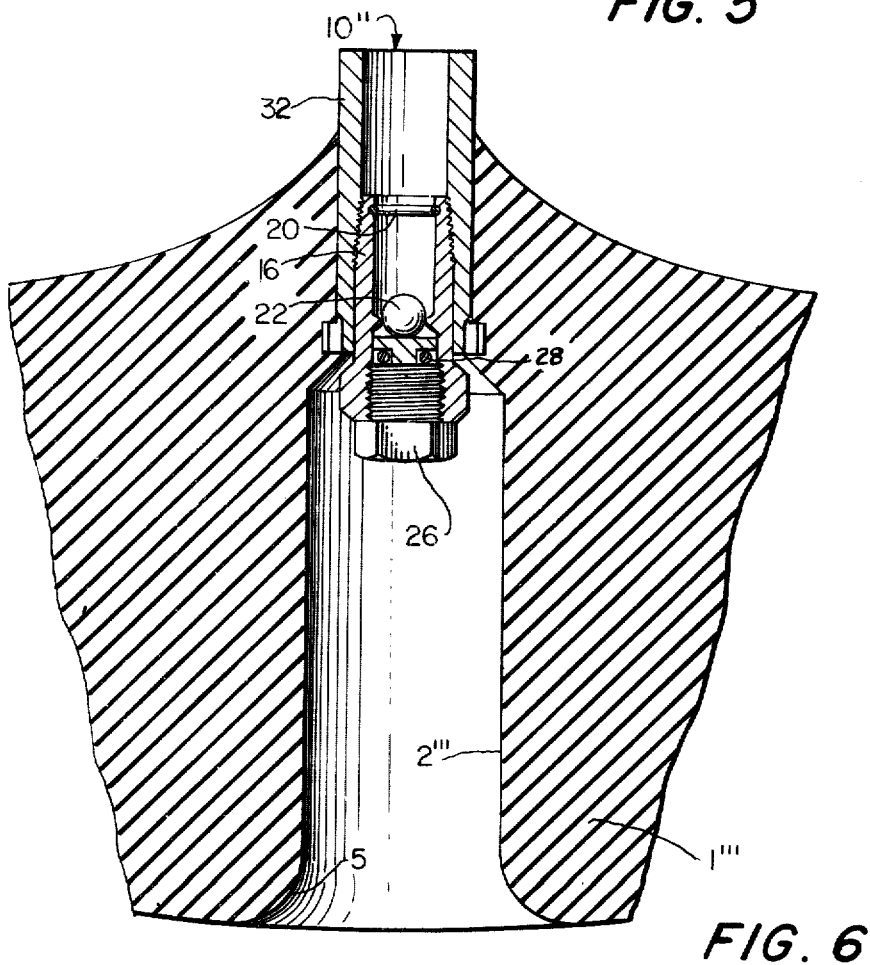
Figure 7:
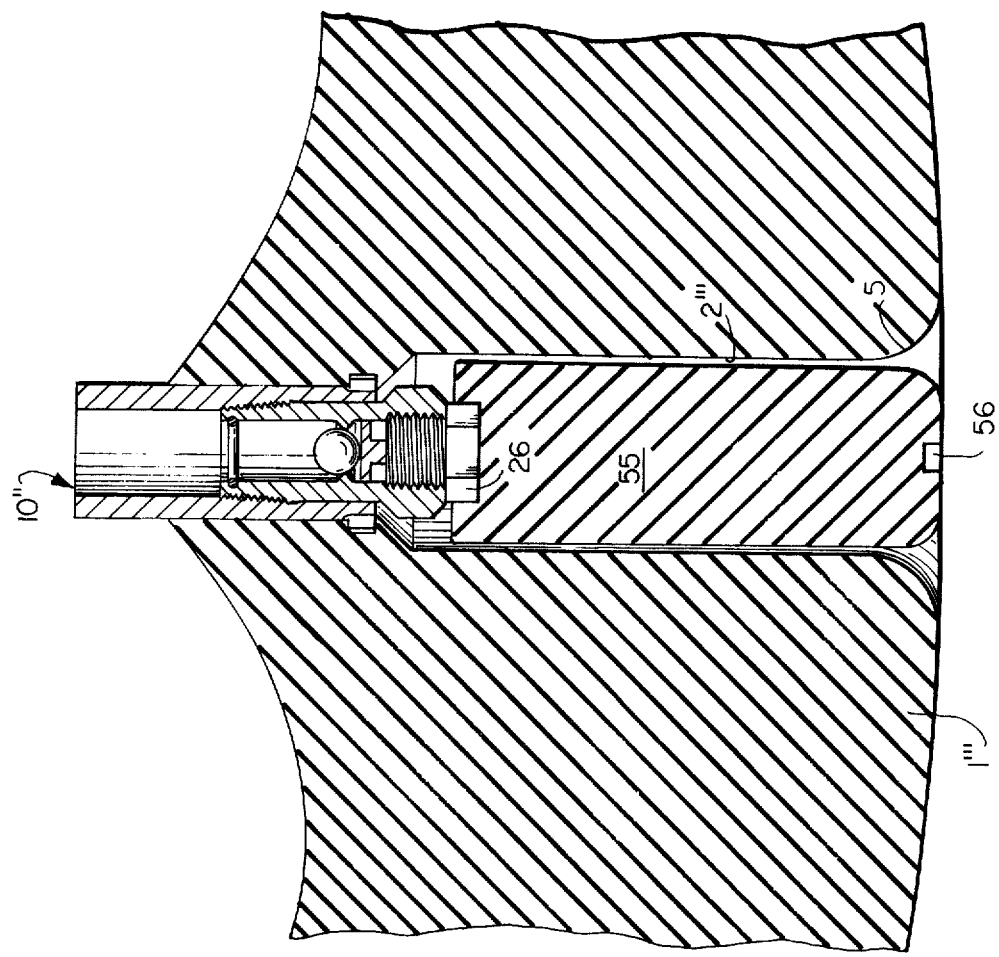
Figure 8:
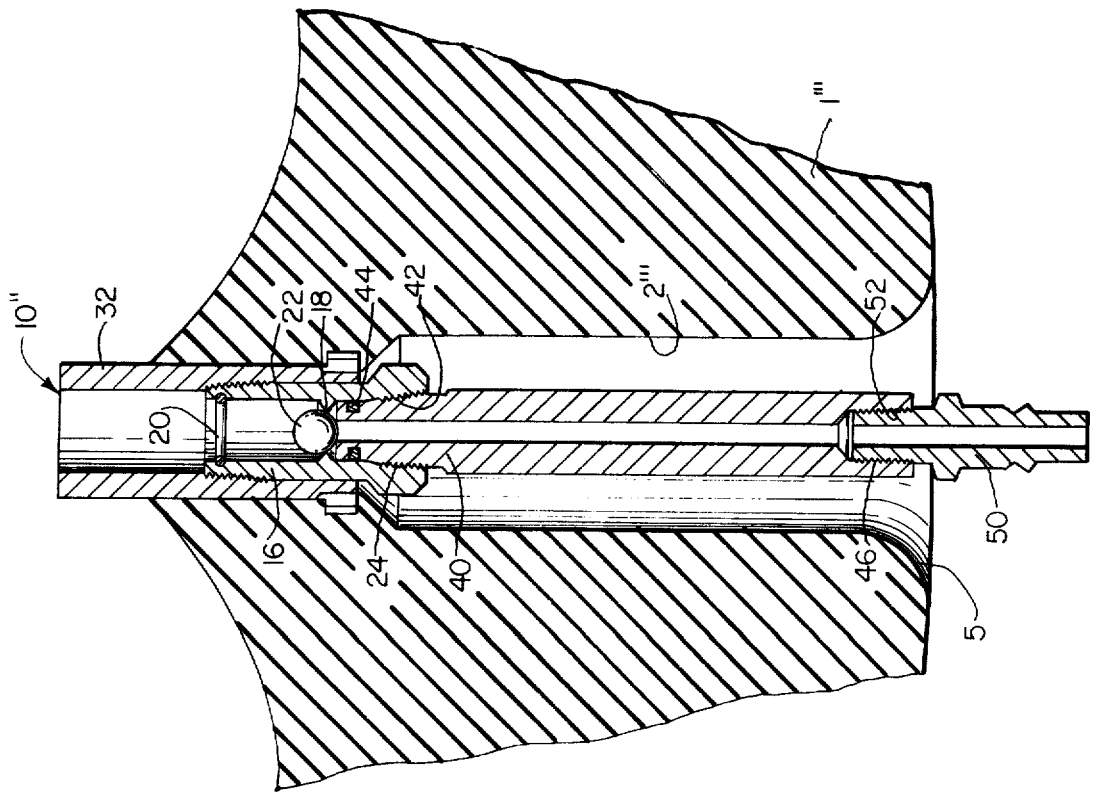

FIG. 7 shows a ball and valve assembly similar to FIG. 6, but wherein the screw plug member has been removed from the valve assembly and an inflation adapter has been inserted therein for purposes of inflating the ball; and FIG. 8 shows a ball similar to FIG. 6 in which the screw plug member of the valve assembly has been fitted with an elastomeric core member which virtually closes the well in which the valve is recessed and makes the outside surface of the ball approximately flush.

Figure 1:
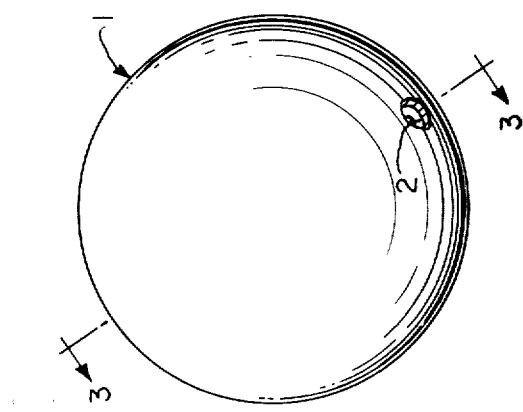
FIG. 1 is a view of a pipeline go-devil in the shape of an inflatable ball made according to this invention and showing the well in which the valve assembly is recessed.

Referring now to FIG. 1, the illustrated inflatable pipeline cleaning device comprises a ball 1 which is often manufactured in two semi-spherical halves and then bonded together to form a complete ball. The inflation valve assembly is recessed within the well 2 as can be seen in other views, and the ball is manufactured in a large variety of diameters to cooperate with pipelines of different nominal sizes.

Figure 2:
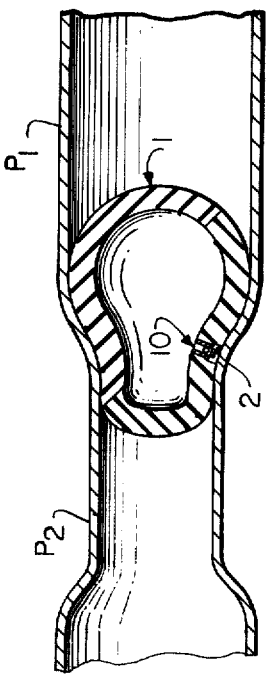
FIG. 2 is a view of a ball according to the present invention passing through a pipeline which includes a short length of reduced diameter.

FIG. 2 shows the ball 1 passing through a pipeline P having a larger portion P1 and a smaller portion P2, the pipeline then extending out to the larger diameter after the restriction has ended. This views shows the manner in which the ball can change its shape in order to pass through a smaller inside diameter which it may encounter. The valve assembly is generally referred to in FIG. 2 by the reference numeral 10.

Figure 3:
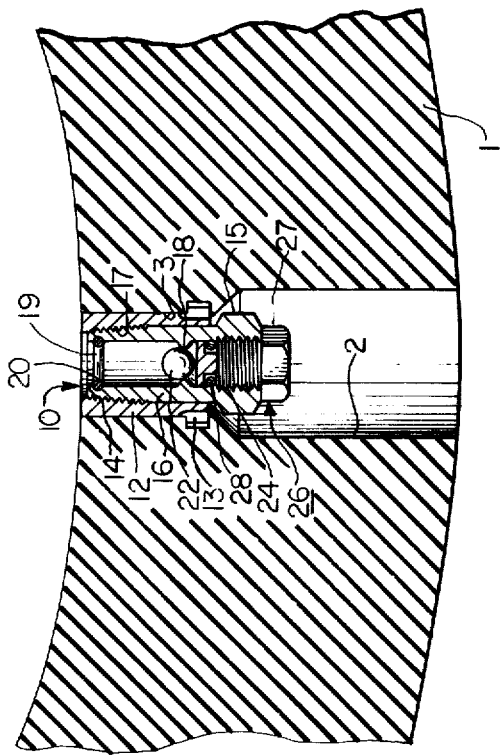
FIG. 3 shows a partial cross-section through a wall of a pipeline ball of large diameter in which the valve assembly has been recessed in a well so that it is within the inside 50% of the wall thickness.

FIG. 3 shows a partial sectional view of the wall taken along line 3—3 of FIG. 1 in the vicinity of the valve assembly, and showing the well 2 extending inwardly into a large diameter ball. The valve assembly 10 is bonded to a smaller diameter bore 3 near the inner wall of the ball. The valve assembly 10 includes an inner sleeve member 12 having tooth-like elements 13 around its outer periphery and having a threaded portion 14 near its inner periphery. The valve assembly 10 also includes a separable valve-carrier member 16 having a bore extending through its center and having threads 17 for engaging the threads 14 when the valve-carrier member 16 is inserted into the sleeve 12. The valve-carrier member 16 also has hexagonal flats 15 at its outer end so that it can be loosened and withdrawn from the sleeve 12 using a socket wrench. The carrier member 16 has a ball seat 18 located near its center and a recess 19 located near its inner end. An O-ring 20 is contained in the recess and this O-ring maintains a check valve ball 22 within the central bore of the valve-carrier member 16 so that it does not fall into the hollow central portion of the ball 1.

The carrier member 16 is also provided with threads 24 into which a final sealing plug member 26 can be screwed, the sealing plug 26 having a recess near its inner end which receives an O-ring 28 to seal against the inner bore of the valve-carrier member 16 when the screw plug 26 is screwed into place on the threads 24. The screw plug 26 has a hexagonal head 27 so that it can also be applied and removed with respect to the remainder of the valve assembly 10.

Figure 4:
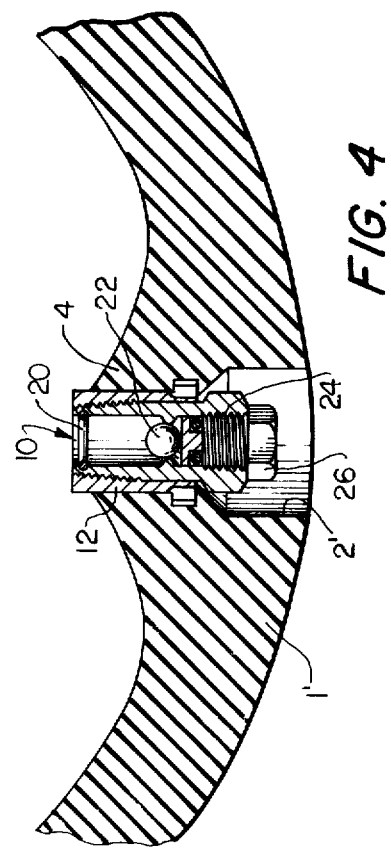
FIG. 4 is a view of a valve similar to FIG. 3 but showing the valve assembly mounted in a small-diameter ball in which the wall is not very thick but in which a portion of the wall has been thickened in the vicinity of the valve assembly so as to recess it somewhat within the outer periphery of the ball.

FIG. 4 is similar to FIG. 3 as far as the valve assembly is concerned, but the wall 1' of the ball is considerably smaller in diameter and therefore the well 2' cannot be made as deep as in the case of FIG. 3. It is therefore necessary for the wall to be locally thickened as at 4 so as to provide support for the sleeve 12 and permit the valve assembly 10 to be recessed somewhat inside of the outer diameter of the ball. The fact that the wall 1' is thickened in the vicinity of the valve as shown by the reference character 4 does not affect the performance of the ball in view of the fact that there is no necessity that the ball be balanced symmetrically as it travels through the pipeline.

Figure 5:
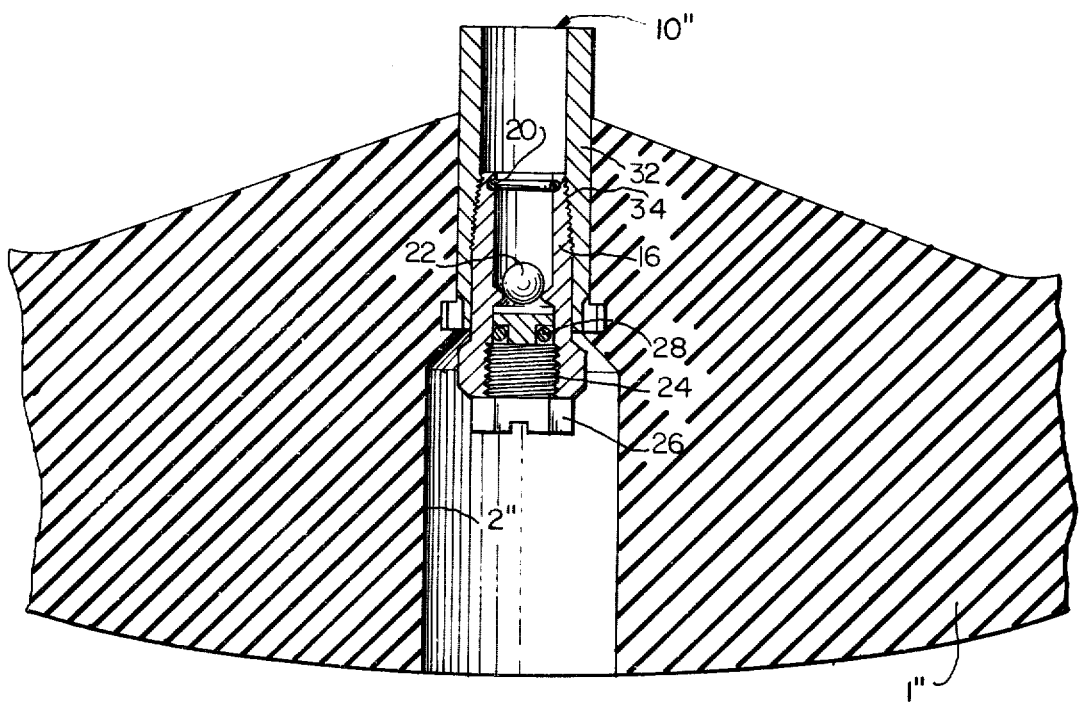
FIGS. 5 and 6 shows valve assemblies which have been recessed deeper into the wall of the ball, and particularly where a portion of the wall has been thickened to provide further support for a lengthened sleeve member of the valve assembly which is bonded to the wall.

FIG. 5 as well as FIGS. 6, 7, and 8 show a valve assembly 10'' which is almost the same as that shown in FIG. 3 except that the sleeve 32 which is bonded to the rubber wall 1'' is longer than the sleeve 12. This longer sleeve is labelled 32 in FIGS. 5 through 8 inclusive and it will be seen that all of the rubber walls shown in these figures are thickened internally in the vicinity of the sleeve 32. The wall shown in FIG. 5 is labelled 1'' and it has a bore labelled 2'' into which the valve assembly 10'' is recessed. The sleeve 32 has a threaded internal portion 34 into which the valve-carrier member 16 is screwed, the carrier member carrying an O-ring 20 and a valve ball 22 which are identical to those shown in FIG. 3.

FIG. 6 is similar to FIG. 5 to the extent that the valve assembly 10'' is the same as is shown in FIG. 5 including the elongated sleeve member 32, the valve-carrier member 16 and the plug 26, but the elastomeric ball diameter is greater so that the wall thickness 1''' is also greater and the ball well 2''' is also deeper and is rounded as shown at 5. This is the type of shape that would be used in balls of the largest diameter, for instance, balls which are 3 or 4 feet in diameter, or even greater.

FIG. 7 shows essentially the same ball and valve assembly structure as is shown in FIG. 6, except that the plug 26 has been removed and has been replaced by an inflation adapter 40 comprising an elongated tube having threads 42 which engage the threads 24 of the valve-carrier member 16, the adapter 40 also having an O-ring 44 to seal the adapter to the valve-carrier member 16. The lower end of the adapter 40 is also internally threaded as at 46 and receives an inflation stem 50 having threads 52 at its inner end so that it can be screwed into whatever length of inflation adapter 40 is necessary. In a small diameter ball as shown in FIG. 4, the inflation stem 50 would screw directly into the threads 24, but in a very large diameter ball, the inflation adapter 40 might be 6 or 8 inches long. When the ball has been inflated to the correct pressure, the inflation adapter 40 is unscrewed from the threads 24 and the check ball 22 in place on the seat 18 provides a good enough temporary seal to allow time in which to finish unscrewing the adapter 40 and insert the positive sealing plug 26 in place.

FIG. 8 shows a structure similar to FIGS. 6 and 7 but wherein the plug 26 has been provided with an elastomeric core member 55 which is bonded to the head of the plug 26 and substantially fills the well 2''' so that the ball appears to have a substantially smooth exterior surface. A screwdriver slot 56 can be provided in the core member 55 to facilitate removal of the plug 26 to which it is bonded. Otherwise, the valve assembly 10'' in FIG. 8 is the same as the one shown in FIGS. 7 and 6 inclusive.

The present invention is not to be limited to the exact embodiments illustrated in the drawings, for obviously changes may be made therein within the scope of the following claims.

I claim:

1. A pipeline cleaning ball and valve structure, comprising:
   a. an inflatable ball having a hollow center surrounded by thick walls of elastomeric material defining the outer surfaces of the ball, and having a wall recessed part-way into one wall from outside the ball and the well joining a bore extending the rest of the way through the wall into the center of the ball;
   b. a valve assembly in the well and including a sleeve member bonded to the elastomeric material at the bore and internally threaded, and including a valve-carrier member having external threads by which it is removably secured in the threaded sleeve member and said carrier member having an opening through it with a check valve in the opening located within the thickness of the wall of the ball and recessed within the length of the carrier member, and including a plug member operative to removably close and seal the opening through the valve carrier member, the valve assembly and plug member being recessed in said well beneath the outer periphery of the ball by a distance amounting to a substantial proportion of the thickness of the wall of the ball.

2. The ball and valve structure as set forth in claim 1, wherein said check valve comprises a valve seat disposed transversely across the opening; a check ball in the opening on the side of the seat toward the center of the elastomeric ball; and means for retaining the check ball within the opening through the carrier member.

3. The ball and valve structure as set forth in claim 2, wherein the opening through the carrier member is internally threaded at the end thereof nearer the outer surface of the elastomeric ball, and said plug means being threaded to engage the carrier member to seal its opening.

4. The ball and valve structure as set forth in claim 3, wherein said valve assembly includes an elongated inflation adapter comprising a tube having an inner end threaded for connectably engaging said internally threaded valve-carrier member, and the length of the tube approximating the depth of the recessed well.

5. The ball and valve structure as set forth in claim 1, wherein the well and the valve assembly are both recessed deep into the wall of the elastomeric ball, and said wall in the vicinity of the valve assembly is thickened inwardly toward the center of the ball to improve its support of the sleeve member of the valve assembly.

6. The ball and valve structure as set forth in claim 1, wherein an elastomeric core member shaped to fill said well is attached to said plug member and substantially fills the well flush with the outer surface of the ball when the plug member is sealing the opening through the valve-carrier member.

* * * * *